United States Patent Office 3,559,274
Patented Feb. 2, 1971

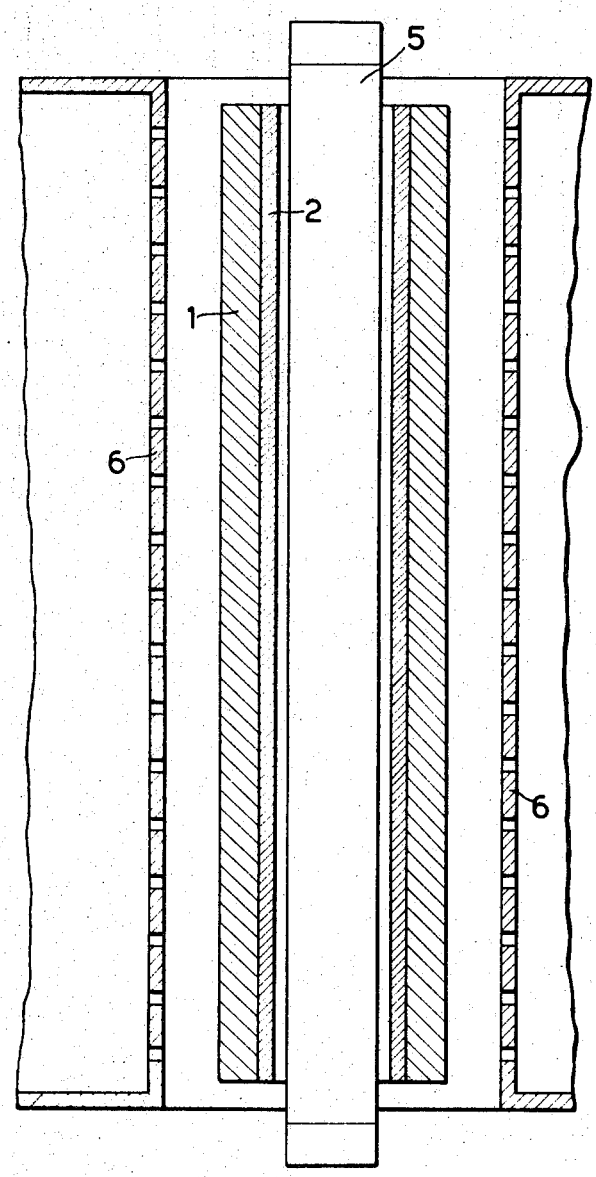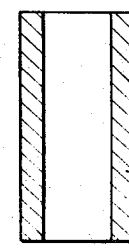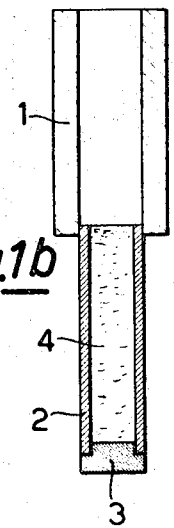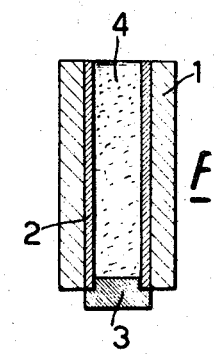

3,559,274
PROCESS FOR THE SHEATHING OF TUBULAR NUCLEAR FUEL ELEMENTS
Saverio Granata, Milan, Italy, assignor to Snam Progetti S.p.A., Milan, Italy
Filed Aug. 3, 1966, Ser. No. 570,024
Claims priority, application Italy, Aug. 6, 1965, 17,768/65
Int. Cl. B23p 11/02
U.S. Cl. 29—447       4 Claims

ABSTRACT OF THE DISCLOSURE

A tubular nuclear fuel element is given an internal sheathing by thrusting a pipe, shrunk by cooling, into the element and then raising the temperature of the pipe to room temperature so that it expands and presses tightly against the inner wall of the fuel element; and thereafter the sheathing is heated internally and the fuel element is cooled externally to cause inter-diffusion at the interface between the sheathing material and the fuel element without establishing preferential crystalline orientations in the fuel.

---

The present invention refers to a process of protective sheathing for tubular elements of nuclear fuel used in nuclear reactors.

It is known that one of the main problems concerning the protective sheathing of the nuclear fuels consists in the production of elements wherein a perfect and lasting adhesion between fuel and sheathing material is required.

Particularly, if use is made of tubular nuclear fuel elements, this problem becomes very important especially if the protective sheathing is required to be inside the uranium pipe.

Generally, for the production of this type of nuclear fuel elements use is made of simultaneous coextrusion of the fuel and of the sheathing material.

This prior practice, although allowing the production of nuclear fuel elements which may be particularly long (about 3.5 metres), has the disadvantage of promoting, e.g., in case metallic uranium is used as fuel, a marked preferential crystalline orientation which gives particularly harmful results when the material is subjected to radiation.

Such a system comprises a considerable number of working stages, such as thermal treatments and mechanical treatments which are characteristic of the coextrusion processes and moreover said treatments have to be carefully controlled in order to prevent deteriorations of the chemical or chemical-physical nature of the fissile material.

For example, in order to prevent the oxidation of said material, use is made during the working stages of metallic sheathings (of copper), said sheathings being later carefully removed by means of chemical processes such as dissolving with acids.

Such a process besides being, as above mentioned, remarkably complicated, presents systematically the following drawbacks:

(1) Establishment of preferential crystalline orientations in the fuel often not eliminable or not completely eliminable, which provoke a considerable anisotropic growth during the radiation. Said preferential orientation is due to the direct mechanical treatments to which the fissile material was subjected during the working.

(2) In the coextrusion process, it is impossible to maintain the lengthwise, ends enclusive, uniformity of the thickness of the uranium pipe.

As the ends are required, as a rule, to have an exact profile, it is necessary therefore to use further mechanical working (turning) producing in this way a considerable amount of waste which, being mixed with zirconium, may not be directly utilized again, and has to be sent to chemical purification plants, the same occurring to all the other waste such as: badly done coextrusions, elements lacking in complete adhesion between sheathing and fuel and so on.

The process according to the present invention presents comparatively few operations and is easily performed.

In practice, by means of fusion, fuel is shaped, the surfaces are ground mechanically and pickled, the sheathing pipe is introduced into the fuel pipe, an interdiffusion between the surfaces which are in contact is realized and finally the whole is subjected to a thermal treatment in order to obtain the desired structure in the fuel.

The mechanical operations which may give rise to preferential crystalline orientations on the fuel are avoided.

The greater part of recovered waste material may be used directly by refusion.

Therefore the present invention refers to a process of protective sheathing of metallic nuclear fuel pipes which does not promote the preferential crystalline orientation of the structure of nuclear fuel, said process being a rather easy execution and therefore of lower cost.

Said process allows the internal sheathing of metallic uranium pipes or its alloys being based on the different thermal expansions of the uranium and the sheathing material and gives rise to a perfect adhesion between the two materials.

Moreover, the present invention includes a second operation consisting in a suitable heat treatment promoting always an intermetallic diffusion between the two treated materials, in order to warrant the lasting adhesion between them.

The practice of my invention is illustrated in the accompanying drawings in which:

FIGS. 1A, 1B and 1C are vertical sections of a fuel element and a sheathing pipe therefor diagrammatically illustrating their assembly by internal cooling of the sheathing pipe;

FIG. 2 is a vertical section diagrammatically illustrating apparatus for the internal heating of the sheathing pipe and the external cooling of the fuel element.

Figure 3:
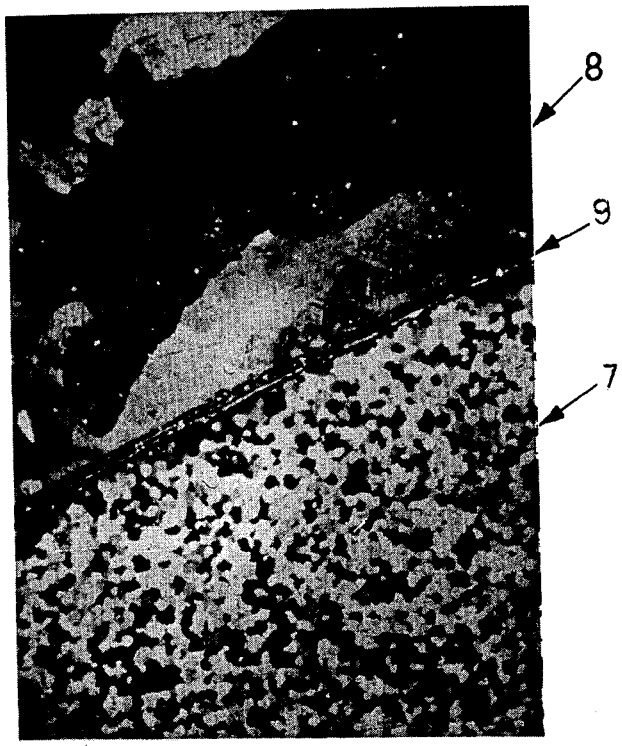
FIG. 3 is a photomicrograph of a cross section of a uranium fuel element sheathed with zirconium in accordance with my invention, showing the interdiffusion zone between the uranium fuel element and the zirconium sheathing pipe.

More precisely the process according to the present invention consists substantially in the following stages:

(1) The introduction of a pipe, sheathing the inside surface of the tubular fuel at temperature between +30° C. and −250° C.

(2) Expansion of said sheathing pipe, at room temperature.

(3) Interdiffusion between sheathing material and fuel material by heating from the inside, starting from the side of said sheathing metal, and by cooling from the outside, starting from the side of the fuel.

The stages (1) and (2) may occur in two ways:

(a) Shrinking the sheathing pipe by cooling, inserting the shrunken sheathing pipe into the fuel element and letting the two elements adhere perfectly by permitting the internal element to expand by raising its temperature to the room temperature; or (b) Inserting simply the sheathing pipe, at room temperature, into the fuel element and causing the two elements to adhere perfectly, by plastic deformation of the internal one, by means of mechanical or hydraulic systems.

In the first case, the outside diameter of the sheathing material pipe 2 (for example Zircaloy 20) is chosen in such a way as to undergo by cooling a shrinkage until it becomes slightly smaller (for example of 0.01 mm.) than the inside one of the uranium pipe 1 (FIG. 1A).

The sheathing pipe having a diameter, at room temperature, as above defined, provided with a closure 3 at one end, is filled, e.g., with liquid nitrogen 4 (FIG. 1B).

In these conditions the sheathing pipe undergoes a shrinkage as above mentioned and may enter easily into the uranium pipe (FIG. 1C). After having drawn out the cooling liquid the assemblage of said pipes is brought again to room temperature, obtaining in such a way a perfect adherence between the two surfaces, face to face, of the materials because of the thermal expansion of the inside pipe.

In the second case, the diameter of the inside pipe, is suitably chosen according to the above mentioned conditions, taking into account that the temperature at which the pipe is inserted does not fall below $-80°$ C. and preferably is just the room temperature. After the inserting, an expansion of the inside pipe is effected by means of mechanical drawing or other means suitable to this purpose as, for example, hydraulic pressure to obtain the perfect adhesion of the surfaces in contact.

Further possibility is the combination comprising the introduction of the cooled, shrunken sheathing pipe into the fuel element and an additional expansion of the sheathing pipe after it has reached room temperature by drawing.

The cold sheathing process according to the invention presents the great advantage, as to the ones in which the heating of the uranium is effected, of avoiding completely the oxidation of said metal, said oxidation is extremely harmful for the subsequent process of metallic interdiffusion.

The two above mentioned stages are followed by the stage of interdiffusion by heating from the inside and by cooling from the outside.

By means of heating effected from the inside of the two pipes, as shown in FIG. 2, and, i.e., taking advantage, in a suitable way, of the coefficients of thermal expansion of the two materials in function of the radial thermal gradient, produced by means of an outside cooling, the intermetallic diffusion is obtained, said diffusion warrants the lasting adhesion between the two materials without presenting harmful drawbacks.

More particularly FIG. 2 shows:

1 ____ The uranium pipe.
2 ____ The sheathing material pipe.
5 ____ A heating element.
6 ____ A drilled wall allowing the injection of a cold gas.

Finally the fissile material and the sheathing one undergo a conventional thermal treatment in order to give the fissile material the more suitable metallurgic structure necessary for a suitable behaviour of the material in the reactor.

The fuel element so sheathed has shown to be perfectly efficient in the sense that even if subjected to stresses of thermal-mechanical type, it has presented neither disjunction between the two materials so welded nor structural variations during said tests.

The fuel so obtained is produced without preferential crystalline orientations which is an important feature of the element produced according to the present invention and this represents a noticeable advantage of the above mentioned process.

As elements constituting the nuclear fuel there may be used: the adjusted uranium or its alloys like the ones based on uranium-molydenum, uranium-niobium, uranium-silicon and uranium-chromium, and alloys of the type uranium-thorium or uranium-plutonium or uranium containing other elements in the form of alloys in a dispersed phase and finally fuel materials based on uranium oxide or uranium-carbide and metal-ceramics.

As sheathing materials may be utilized the ones generally used in the technique of nuclear rectors like zirconium and its alloys, steel or aluminium or its alloys.

Part of the present invention is also the use of fuel in the form of superposed discs in order to constitute a substantially tubular element.

Such a form of execution is particularly advantageous when the fuel material consists of ceramic materials or metal-ceramics containing uranium.

The following example is reported only as an indicative and not restrictive example of the invention.

EXAMPLE

An uranium pipe of the adjusted type having a length of 200 mm. and an inside diameter of 14 mm. and an outside diameter of 22 mm. and a "Zircaloy 20" pipe closed at one end having an inside diameter of 12 mm., an outside diameter of 14.02 mm. and 200 mm. long, are subjected to pickling.

The "Zircaloy 20" pipe is filled with liquor nitrogen; after 20 minutes the thermal equilibrium is reached and the Zircaloy pipe is introduced into the uranium pipe.

The liquid nitrogen is taken away and in said conditions the temperature of the Zircaloy pipe rises to room temperature; consequently this pipe, by expanding, adheres perfectly to the fuel element.

The element so obtained is subjected to a diffusion treatment under severe radial thermal gradient.

The inside part of the element so obtained is subjected to a heating at 850° C. by means of electric resistance whilst the outside part is kept at 300° C. through a stream of argon.

After a suitable time the heating is discontinued and the whole is brought again to room temperature.

Thereafter the sheathed system was subjected to an examination of the uniformities of the diffusion between the two layers by cutting the sample and by observing it by means of physical-metallurgical systems.

A cross section is shown in FIG. 3 (7 represents the zirconium, 8 the uranium and 9 the diffusion zone).

The X-ray analysis by means of the polar figures has detected the nonexistence of preferential crystalline orientations.

Moreover, some samples drawn either along the axis of the uranium pipe or perpendicularly to said axis have shown a thermal expansion coefficient of $13.10^{-6}$ for ° C., between 0° and 200° C.

The embodiments of the invention in which an exclusive property or privilege is claimed are defined as follows:

1. Process for the inside sheathing of a tubular fuel element selected from the group consisting of adjusted uranium, alloys of uranium based on molybdenum, niobium, silicon, and chromium, uranium alloys in a dispersed phase, alloys of uranium-thorium and uranium-plutonium, uranium oxides, uranium carbides and metal-ceramic alloys of uranium, comprising:
    (a) sheathing the inside surface of a tubular fuel element with a metallic sheathing pipe, at a temperature within the range between $+30$ and $-250°$ C.
    (b) then expanding said sheathing pipe at room temperature;
    (c) thereafter causing interdiffusion at the interface of the sheathing metal and the fuel element by heating from the inside, starting from the side of said sheathing metal, and by cooling from the outside, starting from the side of said fuel element.

2. Process according to claim 1 consisting in that the inserting of the sheathing pipe is achieved by shrinkage of the latter by means of cooling at low temperature in the range between $-250°$ C. and $-80°$ C.

3. Process as in claim 2 consisting in shrinking the sheathing element by cooling with a coolant bath at temperatures in the range between $-200°$ C. and 80° C., inserting said element in the shrunken state into the tubular fuel element and in expanding subsequently in order to reach the perfect adhesion of the two elements, said expansion being obtained by raising the temperature from that of shrinkage to that of the room.

4. Process according to claim 1 consisting in that the sheathing element is inserted at a temperature between −80° C. and −30° C. in the fuel element, said sheathing element being brought subsequently to a room temperature and finally being expanded by plastic deformation by means of a mechanical treatment at said temperature.

References Cited

UNITED STATES PATENTS

| | | | |
|---|---|---|---|
| 1,078,906 | 1/1913 | Eldred | 20—473.5 |
| 1,193,667 | 8/1916 | Corey | 29/474.4 |
| 2,713,196 | 7/1955 | Brown | 29—497.5 X |
| 2,967,139 | 1/1961 | Bartoszak | 29—473.5 |
| 3,025,596 | 3/1962 | Ward | 29—474.5 X |
| 3,101,531 | 8/1963 | Roseberry | 29—474.4 |
| 3,156,042 | 11/1964 | Reed | 29—471.5 |
| 3,235,958 | 2/1966 | Gauthron | 29—474.3 |
| 3,246,973 | 4/1966 | Bange | 29—498 X |
| 3,352,004 | 11/1967 | Baque | 29—474.3 |

FOREIGN PATENTS

| | | |
|---|---|---|
| 2,344 | 12/1889 | Sweden. |
| 147,995 | 11/1909 | Germany. |
| 609,035 | 9/1948 | Great Britain. |
| 666,958 | 10/1938 | Germany. |
| 1,065,100 | 9/1959 | Germany. |

CHARLIE T. MOON, Primary Examiner

R. B. LAZARUS, Assistant Examiner

U.S. Cl. X.R.

29—473.5, 474.3, 498

PO-1050
(5/69)

UNITED STATES PATENT OFFICE
CERTIFICATE OF CORRECTION

Patent No. 3,559,274  Dated February 2, 1971

Inventor(s) Saverio Granata

It is certified that error appears in the above-identified patent and that said Letters Patent are hereby corrected as shown below:

Column 4, line 75, correct "80°C." to read -- -80°C. --

Signed and sealed this 12th day of February 1974.

(SEAL)
Attest:

EDWARD M. FLETCHER, JR.  C. MARSHALL DANN
Attesting Officer  Commissioner of Patents